United States Patent
Nishikawa et al.

(10) Patent No.: US 10,651,556 B2
(45) Date of Patent: May 12, 2020

(54) ANTENNA UNIT AND ELECTRONIC DEVICE

(71) Applicant: Panasonic Intellectual Property Management Co., Ltd., Osaka (JP)

(72) Inventors: Kenji Nishikawa, Hyogo (JP); Shingo Sumi, Miyagi (JP); Yasunori Komukai, Miyagi (JP); Yukinari Takahashi, Miyagi (JP); Yu Ono, Miyagi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/990,006

(22) Filed: May 25, 2018

(65) Prior Publication Data

US 2018/0277951 A1    Sep. 27, 2018

Related U.S. Application Data

(63) Continuation of application No. PCT/JP2017/001159, filed on Jan. 16, 2017.

(30) Foreign Application Priority Data

Feb. 18, 2016   (JP) ................................. 2016-029294

(51) Int. Cl.
*H01Q 5/307* (2015.01)
*H01Q 1/48* (2006.01)
(Continued)

(52) U.S. Cl.
CPC ............. *H01Q 5/307* (2015.01); *H01Q 1/243* (2013.01); *H01Q 1/48* (2013.01); *H01Q 5/328* (2015.01);
(Continued)

(58) Field of Classification Search
CPC .......... H01Q 1/243; H01Q 9/42; H01Q 5/378; H01Q 5/307; H01Q 5/328; H01Q 5/385;
(Continued)

(56) References Cited

U.S. PATENT DOCUMENTS 5,835,067 A * 11/1998 Goodman ................ H01Q 9/36
                                                        343/722
9,484,631 B1 * 11/2016 Napoles .................. H01Q 1/243
(Continued)

FOREIGN PATENT DOCUMENTS

| JP | 2007-088975 A | 4/2007 |
| JP | 4233100 B2 | 12/2008 |
| WO | 2007/091554 A1 | 8/2007 |

OTHER PUBLICATIONS

The Extended European Search Report dated Jan. 23, 2019 for the related European Patent Application No. 17752865.0.
(Continued)

*Primary Examiner* — Graham P Smith
*Assistant Examiner* — Jae K Kim
(74) *Attorney, Agent, or Firm* — Renner, Otto, Boisselle & Sklar, LLP

(57) ABSTRACT

An antenna unit includes a conductive ground plate, a first antenna element, and a second antenna element. The first antenna element includes a first end connected to a feedpoint and a second end containing an open end. A part of the first antenna element is disposed along the conductive ground plate. The second antenna element branches off the first antenna element at a branch point on the first antenna element. The second antenna element is disposed between the part of the first antenna element disposed along the conductive ground plate and the conductive ground plate. The first antenna element resonates at a first frequency. The second antenna element and a segment between the first end
(Continued)

and the branch point of the first antenna element resonate at a second frequency that is higher than the first frequency.

13 Claims, 8 Drawing Sheets

(51) Int. Cl.
  *H01Q 5/385* (2015.01)
  *H01Q 5/371* (2015.01)
  *H01Q 1/24* (2006.01)
  *H01Q 5/378* (2015.01)
  *H01Q 9/42* (2006.01)
  *H01Q 5/328* (2015.01)
  *H04B 1/3827* (2015.01)
  *H01Q 9/30* (2006.01)

(52) U.S. Cl.
  CPC ............ *H01Q 5/371* (2015.01); *H01Q 5/378* (2015.01); *H01Q 5/385* (2015.01); *H01Q 9/42* (2013.01); *H04B 1/3838* (2013.01); *H01Q 9/30* (2013.01)

(58) Field of Classification Search
  CPC . H01Q 1/48; H01Q 5/371; H01Q 9/30; H04B 1/3838
  See application file for complete search history.

(56) References Cited

U.S. PATENT DOCUMENTS

| | | | |
|---|---|---|---|
| 2006/0038736 A1* | 2/2006 | Hui | H01Q 1/243 343/835 |
| 2007/0247373 A1* | 10/2007 | Egorov | H01Q 1/243 343/702 |
| 2007/0262906 A1* | 11/2007 | Haim | H01Q 1/2266 343/700 MS |
| 2008/0180333 A1* | 7/2008 | Martiskainen | H01Q 1/243 343/722 |
| 2008/0238780 A1* | 10/2008 | Ponce De Leon | H01Q 1/52 343/700 MS |
| 2009/0079639 A1* | 3/2009 | Hotta | H01Q 1/243 343/702 |
| 2010/0123640 A1* | 5/2010 | Hui | H01Q 1/48 343/848 |
| 2011/0057857 A1* | 3/2011 | Nagano | H01Q 1/243 343/876 |
| 2011/0312393 A1* | 12/2011 | Pulimi | H01Q 1/245 455/575.7 |
| 2012/0313830 A1* | 12/2012 | Lee | H01Q 1/243 343/722 |
| 2013/0127677 A1* | 5/2013 | Lin | H01Q 5/328 343/722 |
| 2013/0265201 A1* | 10/2013 | Kanj | H01Q 1/243 343/700 MS |
| 2014/0091981 A1* | 4/2014 | Komulainen | H01Q 1/521 343/893 |
| 2014/0327584 A1* | 11/2014 | Chang | H01Q 1/243 343/702 |
| 2014/0333504 A1* | 11/2014 | Basirat | H01Q 9/42 343/893 |

OTHER PUBLICATIONS

International Search Report for related App. No. PCT/JP2017/001159, dated Mar. 21, 2017.

* cited by examiner

ANTENNA UNIT AND ELECTRONIC DEVICE

TECHNICAL FIELD

The present disclosure relates to an antenna unit designed to operate on multiple bands of frequencies. The present disclosure relates to an electronic device equipped with such an antenna unit.

BACKGROUND ART

Antenna units for electronic devices that serve as portable wireless communication tools are required to be compact and operate on multiple bands of frequencies.

PTL 1 discloses a wireless communication tool equipped with antenna components including a first antenna element and a second antenna element that resonate at different frequencies, for example.

CITATION LIST

Patent Literature

PTL 1: Japanese Patent No. 4233100

SUMMARY

An antenna unit according to an aspect of the present disclosure includes a conductive ground plate, a first antenna element, and a second antenna element. The first antenna element includes a first end connected to a feedpoint and a second end containing an open end. A part of the first antenna element is disposed along the conductive ground plate. The second antenna element branches off the first antenna element at a branch point on the first antenna element. The second antenna element is disposed between the part of the first antenna element disposed along the conductive ground plate and the conductive ground plate. The first antenna element resonates at a first frequency. The second antenna element and a segment between the first end and the branch point of the first antenna element resonate at a second frequency that is higher than the first frequency.

DESCRIPTION OF EMBODIMENTS

Exemplary embodiments will now be described in detail with reference to the drawings as appropriate. However, description in more detail than is necessary may be omitted. For example, detailed descriptions of well-known matters and redundant descriptions of substantially identical structural elements may be omitted so as to avoid unnecessarily redundant description and enable those of skill in the art to readily understand the exemplary embodiments herein.

The inventor(s) have provided the accompanying drawings and the following description to allow those skilled in the art to fully understand the present disclosure. Accordingly, these examples should not be construed to limit the spirit and scope of the appended claims.

The exemplary embodiments will be described with reference to XYZ Cartesian coordinates shown on the drawings.

1. First Exemplary Embodiment

Figure 1:
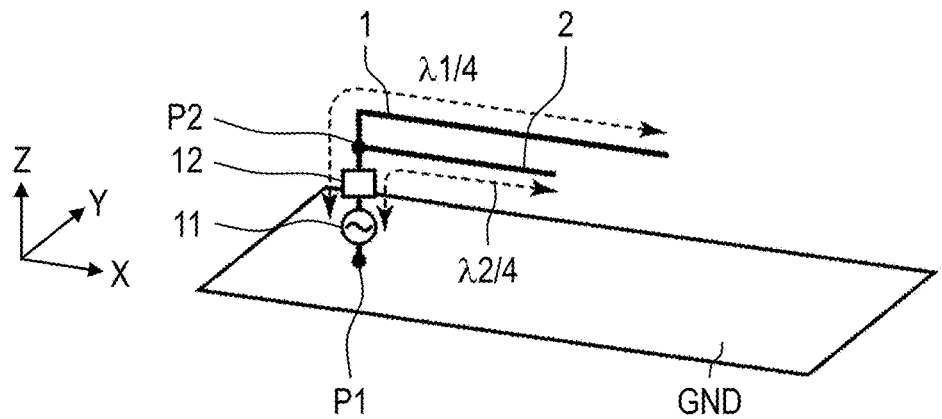
FIG. 1 is a schematic view illustrating a configuration of an antenna unit according to a first exemplary embodiment.
Figure 2:
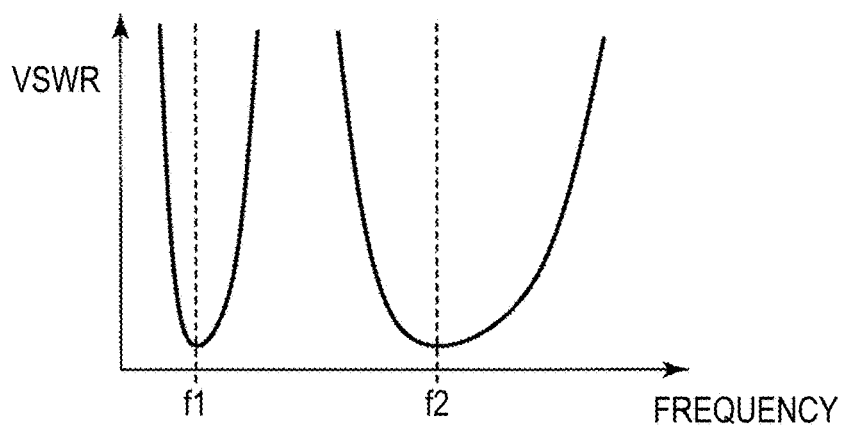
FIG. 2 is a schematic graph illustrating a profile of voltage standing wave ratio (VSWR) versus frequency of the antenna unit of FIG. 1.

With reference to FIGS. 1 and 2, an antenna unit according to a first exemplary embodiment will now be described.
1-1. Configuration FIG. 1 is a schematic view illustrating a configuration of an antenna unit according to the first exemplary embodiment. The antenna unit of FIG. 1 includes ground conductor GND, first antenna element 1, and second antenna element 2.

Ground conductor GND is a conductive ground plate. In this specification, ground conductor GND is also referred to as a "conductive ground plate". In an example of FIG. 1, ground conductor GND is disposed parallel to an xy plane.

First and second antenna elements 1 and 2 are each made from a linear or strip-shaped conductor and each constitute an open-ended monopole antenna. First antenna element 1 includes a first end connected to feedpoint 11 and a second end containing an open end. The antenna unit of FIG. 1 undergoes unbalanced feeding via a feed line, e.g. coaxial cable at feedpoint 11. An inner conductor of the feed line is connected to the first end of first antenna element 1, whereas an outer conductor of the feed line is connected to connection point P1 on ground conductor GND. A part of first antenna element 1 is disposed along ground conductor GND. In the example of FIG. 1, first antenna element 1 is bent midway, and a section of a predetermined length containing the open end of first antenna element 1 is disposed along an x-axis. Second antenna element 2 branches off first antenna element 1 at branch point P2 on first antenna element 1. Second antenna element 2 is disposed between the part of first antenna element 1 disposed along ground conductor GND and ground conductor GND. In the example of FIG. 1, second antenna element 2 is disposed along the x-axis.

The antenna unit of FIG. 1 may further include matching circuit 12 between feedpoint 11 and branch point P2 on first antenna element 1.

First antenna element 1 resonates at frequency f1 (which is also referred to as a "first frequency" in this specification). Thus, first antenna element 1 has an electrical length of substantially one quarter of wavelength λ1 corresponding to frequency f1. Second antenna element 2 and a segment between the first end and branch point P2 of first antenna element 1 resonate at frequency f2 (which is also referred to as a "second frequency" in this specification) that is higher than frequency f1. Thus, second antenna element 2 and the segment between the first end and branch point P2 of first antenna element 1 have an electrical length of substantially one quarter of wavelength λ2 corresponding to frequency f2.

1-2. Operation

FIG. 2 is a schematic graph illustrating a profile of VSWR versus frequency of the antenna unit of FIG. 1. The antenna unit of FIG. 1 includes first and second antenna elements 1 and 2, and thus can operate on two frequency bands (containing frequencies f1, f2 respectively).

A decrease in the specific absorption rate (SAR) for the antenna unit of FIG. 1 will now be described.

Electronic devices that serve as portable wireless communication tools are used near the human body. As a result, some radiation power from the antenna of the device is absorbed by the human body. The SAR is a measure of the amount of this absorption and is represented by the following equation (1) using electrical conductivity σ, density ρ, and magnetic field intensity E.

$$SAR = \sigma/(2\rho) \times |E|^2 \qquad (1)$$

The SAR is high in a vicinity of an area (a peak) where high-frequency currents crowd on a conductor. Thus, distributing peak high-frequency currents over the conductor leads to a decrease in the SAR. Since wavelength decreases with an increase in frequency, currents crowd in a small area on a conductor, and the SAR is high especially in the vicinity of the area. Consequently, in the antenna unit of FIG. 1, electric currents tend to be locally concentrated on second antenna element 2 rather than first antenna element 1 that resonates at frequency f1 because second antenna element 2 resonates at higher frequency f2.

Magnetic field intensity E is in inverse proportion to distance. Thus, according to the equation (1), the SAR comes down with an increase in distance between the antenna and the human body. Presumably, when the antenna unit of FIG. 1 is used in an electronic device, other internal components of the electronic device are disposed at a negative side relative to ground conductor GND in the Z-direction, and a casing of the electronic device and a part external to the casing (i.e. the human body of the user) are disposed at a positive side relative to first antenna element 1 in the Z-direction. In the antenna unit of FIG. 1, second antenna element 2 is disposed between first antenna element 1 and ground conductor GND and is thereby kept away from the human body. This configuration reduces the occurrence of a rise in SAR over the frequency band containing frequency f2 even if electric currents of frequency f2 are flowing into second antenna element 2.

1-3. Effects and Others

The antenna unit according to the first exemplary embodiment includes ground conductor GND, first antenna element 1, and second antenna element 2. First antenna element 1 includes the first end connected to feedpoint 11 and the second end containing an open end. The part of first antenna element 1 is disposed along ground conductor GND. Second antenna element 2 branches off first antenna element 1 at branch point P2 on first antenna element 1. Second antenna element 2 is disposed between the part of first antenna element 1 disposed along ground conductor GND and ground conductor GND. First antenna element 1 resonates at frequency f1. Second antenna element 2 and the segment between the first end and branch point P2 of first antenna element 1 resonate at frequency f2 that is higher than frequency f1.

The antenna unit according to the first exemplary embodiment includes first and second antenna elements 1 and 2, and thus can operate on two frequency bands. In the antenna unit according to the first exemplary embodiment, second antenna element 2 is disposed between first antenna element 1 and ground conductor GND. This configuration allows a reduction in SAR during operation on any of the frequency bands.

In the antenna unit according to the first exemplary embodiment, second antenna element 2 is disposed between first antenna element 1 and ground conductor GND. This configuration allows the antenna unit to come down in size, especially profile (height) along a z-axis in FIG. 1.

2. Second Exemplary Embodiment

Figure 3:
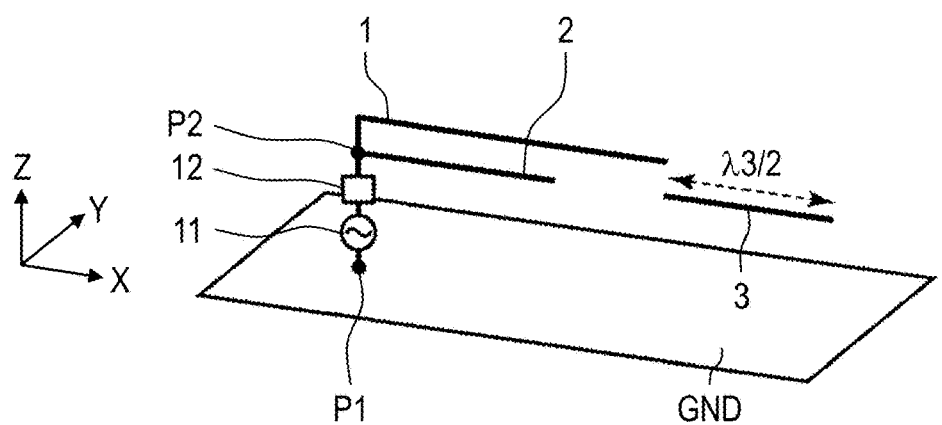
FIG. 3 is a schematic view illustrating a configuration of an antenna unit according to a second exemplary embodiment.
Figure 6:
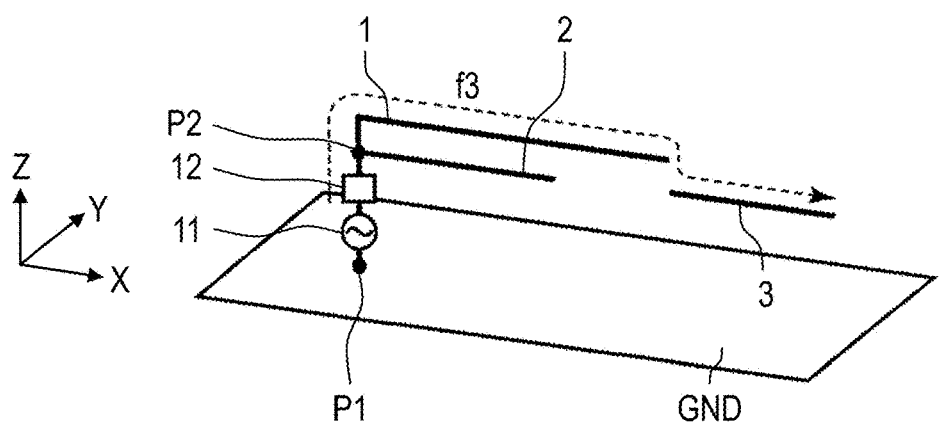
FIG. 6 is a drawing illustrating a flow of electricity in the antenna unit of FIG. 3 operating at frequency f3.

With reference to FIGS. 3 and 6, an antenna unit according to a second exemplary embodiment will now be described.

2-1. Configuration

FIG. 3 is a schematic view illustrating a configuration of the antenna unit according to the second exemplary embodiment. The antenna unit of FIG. 3 is equivalent to an antenna unit of FIG. 1 that further includes parasitic element 3. In this specification, parasitic element 3 is also referred to as a "first passive element". Parasitic element 3 has a first end and a second end. Parasitic element 3 is disposed relative to first antenna element 1 such that the first end is electromagnetically coupled to an open end of first antenna element 1 and the second end is remoter from feedpoint 11 than the first end is. Parasitic element 3 has no electrical connection with ground conductor GND and other conductors.

Parasitic element 3 may be disposed along ground conductor GND. In an example of FIG. 3, parasitic element 3 is disposed along an x-axis.

Parasitic element 3 resonates at frequency f3 (which is also referred to as a "third frequency" in this specification)

that is other than frequencies f1 and f2. Thus, parasitic element 3 has an electrical length that is between substantially one quarter and substantially one half of wavelength λ3 corresponding to frequency f3. Frequency f3 is close to frequency f2 such that parasitic element 3 resonates at frequency f2 as well to some extent. Frequency f3 is higher than frequency f1.

2-2. Operation

Figure 4:
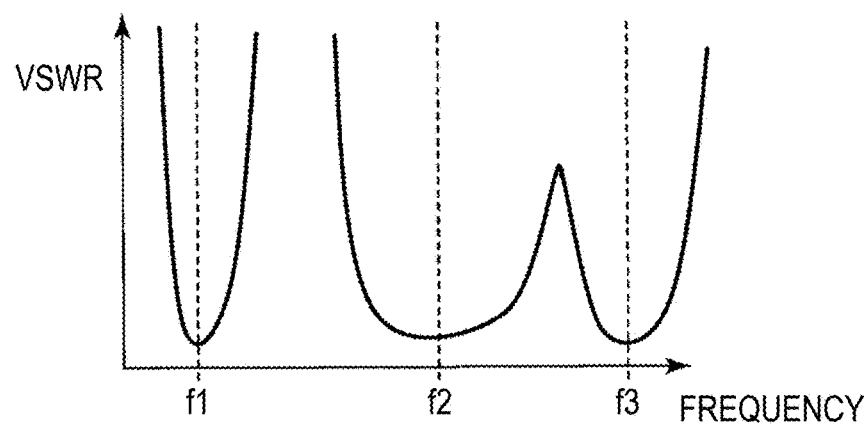
FIG. 4 is a schematic graph illustrating a profile of VSWR versus frequency of the antenna unit of FIG. 3.

FIG. 4 is a schematic graph illustrating a profile of VSWR versus frequency of the antenna unit of FIG. 3. The antenna unit of FIG. 3 includes first and second antenna elements 1 and 2 as well as parasitic element 3, and thus can operate on three frequency bands.

A decrease in the SAR for the antenna unit of FIG. 3 will now be described.

Figure 5:
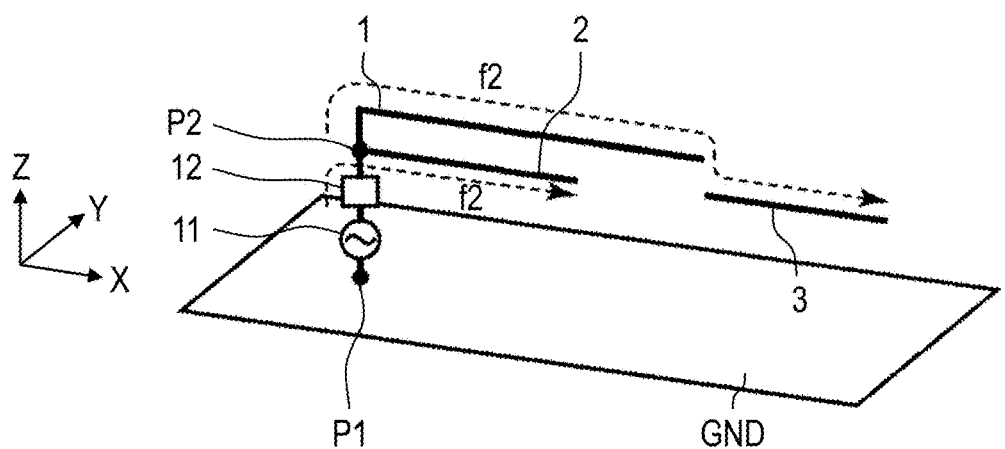
FIG. 5 is a drawing illustrating a flow of electricity in the antenna unit of FIG. 3 operating at frequency f2.

FIG. 5 is a drawing illustrating a flow of electricity in the antenna unit of FIG. 3 operating at frequency f2. Electric currents of frequency f2 flow into first antenna element 1 as well as second antenna element 2 from feedpoint 11 via branch point P2. If frequencies f2 and f3 are close to each other, electric currents of frequency f2 that have flowed into first antenna element 1 flow to parasitic element 3 by means of electromagnetic coupling between first antenna element 1 and parasitic element 3. As described above, parasitic element 3 is disposed relative to first antenna element 1 such that one of the ends of parasitic element 3 is remote from feedpoint 11. This configuration allows electric currents of frequency f2 to flow from feedpoint 11 to the remote end of parasitic element 3 and thus distributes electric currents of frequency f2 to a wider range than another configuration without parasitic element 3. The antenna unit of FIG. 3 allows electric currents of frequency f2 to flow into parasitic element 3, and thereby lowers the level of current crowding on second antenna element 2 and reduces the occurrence of a rise in SAR more effectively than the antenna unit of FIG. 1.

The distance between parasitic element 3 and second antenna element 2 is larger than the distance between parasitic element 3 and first antenna element 1 in order that second antenna element 2 resonates at frequency f2. This configuration hinders electric currents of frequency f2 from directly flowing from second antenna element 2 to parasitic element 3.

FIG. 6 is a drawing illustrating a flow of electricity in the antenna unit of FIG. 3 operating at frequency f3. Electric currents of frequency f3 flow from feedpoint 11 to first antenna element 1 and then flow to parasitic element 3 by means of electromagnetic coupling between first antenna element 1 and parasitic element 3. As a result, parasitic element 3 resonates at frequency f3. Electric currents of frequency f3 not only crowd on parasitic element 3 but also flow to first antenna element 1. This configuration distributes peak electric currents over the elements and thus reduces the occurrence of a rise in SAR.

While the antenna unit of FIG. 3 is operating at frequency f1, electric currents of frequency f1 flow from feedpoint 11 into first antenna element 1. If frequencies f1 and f3 are not close to each other, parasitic element 3 does not resonate at frequency f1, and electric currents of frequency f1 that have flowed into first antenna element 1 do not flow to parasitic element 3. Nevertheless, since wavelength λ1 corresponding to frequency f1 is longer than wavelengths λ2, λ3 corresponding to frequencies f2, f3, electric currents are less inclined to crowd on first antenna element 1 resonating at frequency f1 than second antenna element 2 resonating at frequency f2 and parasitic element 3 resonating at frequency f3. Thus, the antenna unit reduces the occurrence of a rise in SAR even if electric currents of frequency f1 are flowing into first antenna element 1.

2-3. Effects and Others

The antenna unit according to the second exemplary embodiment further includes parasitic element 3. Parasitic element 3 has the first and the second ends, and is disposed relative to first antenna element 1 such that the first end is electromagnetically coupled to the open end of first antenna element 1 and the second end is remoter from feedpoint 11 than the first end is. Parasitic element 3 has no electrical connection with ground conductor GND. Parasitic element 3 resonates at frequency f3 other than frequencies f1 and f2.

The antenna unit according to the second exemplary embodiment includes first and second antenna elements 1 and 2, as well as parasitic element 3, and thus can operate on three frequency bands despite small size. The antenna unit according to the second exemplary embodiment has parasitic element 3 and thus allows a reduction in SAR during operation on any of the frequency bands.

3. Third Exemplary Embodiment

With reference to FIGS. 7 to 11, an antenna unit according to a third exemplary embodiment will now be described.

3-1. Configuration

Figure 7:
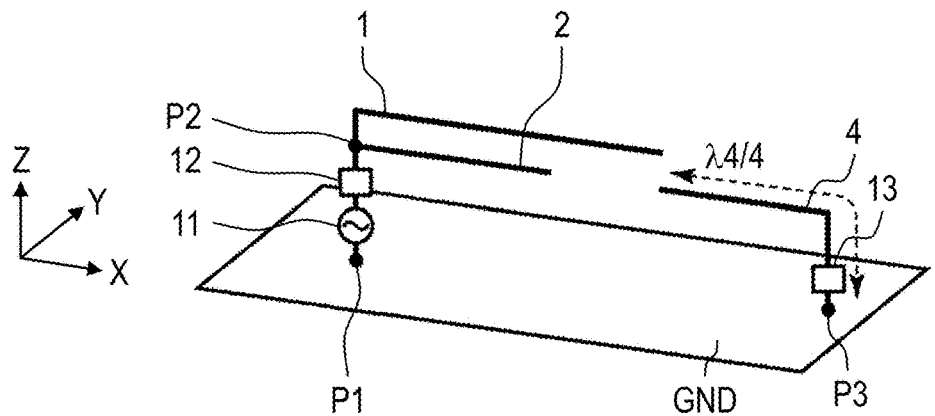
FIG. 7 is a schematic view illustrating a configuration of an antenna unit according to a third exemplary embodiment.

FIG. 7 is a schematic view illustrating a configuration of the antenna unit according to the third exemplary embodiment. The antenna unit of FIG. 7 is equivalent to an antenna unit of FIG. 1 that further includes ground element 4. In this specification, ground element 4 is also referred to as a "second passive element". Ground element 4 has a first end that is electrically connected to connection point P3 on ground conductor GND and a second end that is disposed so as to be electromagnetically coupled to an open end of first antenna element 1. Ground element 4 is disposed relative to first antenna element 1 such that the first end of ground element 4 is remoter from feedpoint 11 than the second end of ground element 4 is.

Ground element 4 may be partly disposed along ground conductor GND. In an example of FIG. 7, ground element 4 has a bend midway, and a section of a predetermined length containing the bend and the second end of ground element 4 (the end electromagnetically coupled to the open end of first antenna element 1) is disposed along an x-axis.

Ground element 4 may be connected to ground conductor GND via reactance circuit 13 that exhibits high impedance at frequency f1.

Ground element 4 resonates at frequency f4 (which is also referred to as a "fourth frequency" in this specification) that is other than frequencies f1 and f2. Thus, ground element 4 has an electrical length of substantially one quarter of wavelength λ4 corresponding to frequency f4. Frequency f4 is close to frequency f2 such that ground element 4 resonates at frequency f2 as well to some extent. Frequency f4 is higher than frequency f1.

Frequency f4 is approximately one and a half times as high as frequency f1, for example.

3-2. Operation

Figure 8:
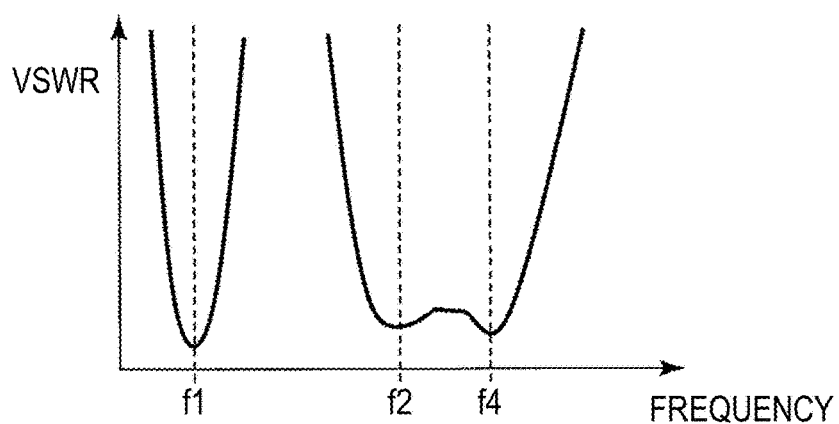
FIG. 8 is a schematic graph illustrating a profile of VSWR versus frequency of the antenna unit of FIG. 7.

FIG. 8 is a schematic graph illustrating a profile of VSWR versus frequency of the antenna unit of FIG. 7. The antenna unit of FIG. 7 includes first and second antenna elements 1 and 2 as well as ground element 4, and thus can operate on three frequency bands.

A decrease in the SAR for the antenna unit of FIG. 7 will now be described.

Figure 9:
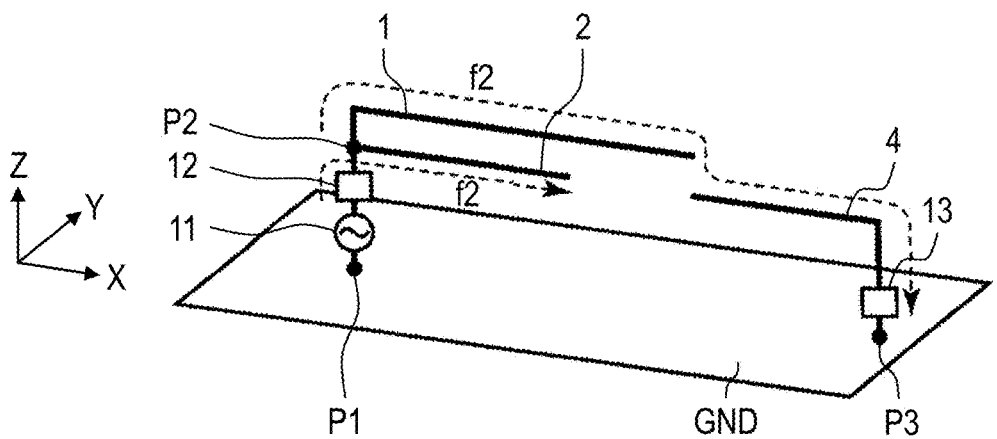
FIG. 9 is a drawing illustrating a flow of electricity in the antenna unit of FIG. 7 operating at frequency f2.

FIG. 9 is a drawing illustrating a flow of electricity in the antenna unit of FIG. 7 operating at frequency f2. Electric currents of frequency f2 flow into first antenna element 1 as well as second antenna element 2 from feedpoint 11. If frequencies f2 and f4 are close to each other, electric currents of frequency f2 that have flowed into first antenna element 1 flow to ground element 4 by means of electromagnetic coupling between first antenna element 1 and ground element 4. Electric currents of frequency f2 that have flowed into ground element 4 flow to ground conductor GND via connection point P3. As described above, ground element 4 is disposed relative to first antenna element 1 such that one of the ends of ground element 4 is remote from feedpoint 11. This configuration allows electric currents of frequency f2 to flow from feedpoint 11 to the remote end of ground element 4 and thus distributes electric currents of frequency f2 to a wider range than another configuration without ground element 4. The antenna unit of FIG. 7 allows electric currents of frequency f2 to flow into ground element 4 and ground conductor GND, and thereby lowers the level of current crowding on second antenna element 2 and reduces the occurrence of a rise in SAR more effectively than the antenna units of FIGS. 1 and 3.

The distance between ground element 4 and second antenna element 2 is larger than the distance between ground element 4 and first antenna element 1 in order that second antenna element 2 resonates at frequency f2. This configuration hinders electric currents of frequency f2 from directly flowing from second antenna element 2 to ground element 4.

Figure 10:
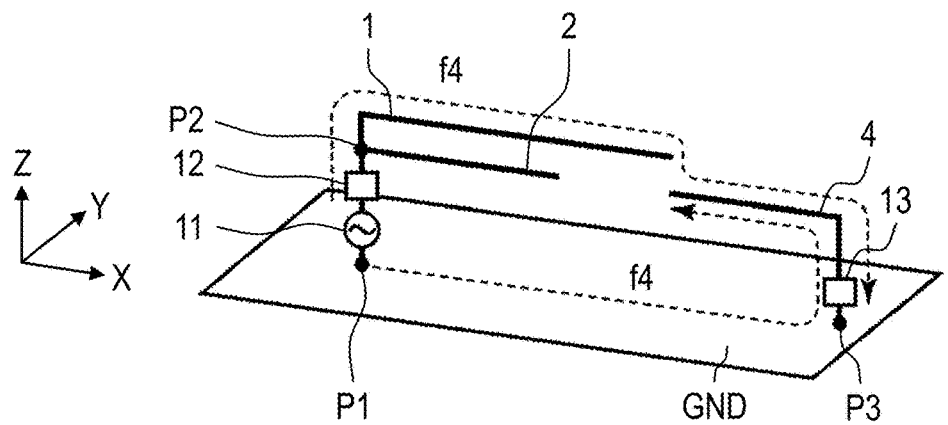
FIG. 10 is a drawing illustrating a flow of electricity in the antenna unit of FIG. 7 operating at frequency f4.

FIG. 10 is a drawing illustrating a flow of electricity in the antenna unit of FIG. 7 operating at frequency f4. Electric currents of frequency f4 flow from feedpoint 11 to first antenna element 1 and then flow to ground element 4 by means of electromagnetic coupling between first antenna element 1 and ground element 4. Electric currents of frequency f4 also flow through ground conductor GND and into ground element 4 via connection point P3. As a result, ground element 4 resonates at frequency f4. Electric currents of frequency f4 not only crowd on ground element 4 but also flow to first antenna element 1 and ground conductor GND. This configuration distributes peak electric currents over the elements and thus reduces the occurrence of a rise in SAR.

While the antenna unit of FIG. 7 is operating at frequency f1, electric currents of frequency f1 flow from feedpoint 11 into first antenna element 1. If frequencies f1 and f4 are not close to each other, ground element 4 does not resonate at frequency f1, and the electric currents of frequency f1 that have flowed into first antenna element 1 do not flow to ground element 4. If frequencies f1 and f4 are close to each other, ground element 4 does not resonate at frequency f1 but resonates only at frequency f4 if ground element 4 is connected to ground conductor GND via reactance circuit 13 that exhibits high impedance at frequency f1. As described above, the antenna unit reduces the occurrence of a rise in SAR even if electric currents of frequency f1 are flowing into first antenna element 1.

3-3. Variation

Figure 11:
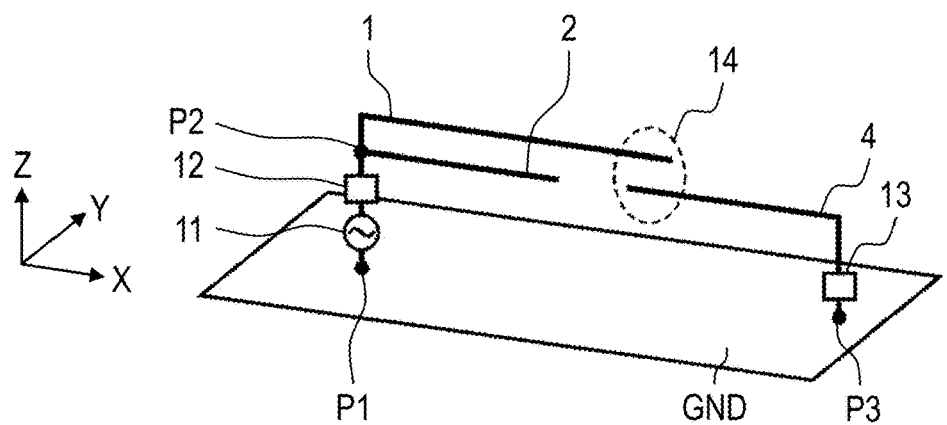
FIG. 11 is a schematic view illustrating a configuration of an antenna unit according to a variation of the third exemplary embodiment.

FIG. 11 is a schematic view illustrating a configuration of an antenna unit according to a variation of the third exemplary embodiment. The antenna unit of FIG. 11 is equivalent to an antenna unit of FIG. 7 that further includes capacity coupler 14 between first antenna element 1 and ground element 4. A section of ground element 4 containing the second end of ground element 4 (the end electromagnetically coupled to the open end of first antenna element 1) is capacitively coupled to a section of first antenna element 1 containing the open end through capacity coupler 14 over a predetermined length. Reactance circuit 13 works to shorten the electrical length of ground element 4 at frequency f4. Thus, reactance circuit 13 includes a capacitor.

Since capacity coupler 14 is disposed between first antenna element 1 and ground element 4, electromagnetic coupling between first antenna element 1 and ground element 4 is strengthened. This configuration facilitates the flow of electric currents of frequencies f2 and f4 between first antenna element 1 and ground element 4 and reduces the occurrence of current crowding.

The length of ground element 4 may be increased to distribute electric currents of a certain frequency over a wider range rather than letting the electric currents crowd in a narrow range. The length of ground element 4 may be increased to extend the distance from feedpoint 11 to the first end of ground element 4 (the end electrically connected to connection point P3 on ground conductor GND) and enable the antenna unit to cover a wide frequency band. The length of ground element 4 needs to be increased to have capacity coupler 14 installed. Even if the length of ground element 4 is longer than substantially one quarter of wavelength λ4 corresponding to frequency f4 for any of these purposes, ground element 4 resonates at frequency f4 because of reactance circuit 13 that shortens the electrical length of ground element 4.

3-4. Effects and Others

The antenna unit according to the third exemplary embodiment further includes ground element 4. Ground element 4 has the first end that is electrically connected to the connection point on ground conductor GND and the second end that is disposed so as to be electromagnetically coupled to the open end of first antenna element 1. Ground element 4 is disposed relative to first antenna element 1 such that the first end of ground element 4 is remoter from feedpoint 11 than the second end of ground element 4 is. Ground element 4 resonates at frequency f4 other than frequencies f1 and f2.

In the antenna unit according to the third exemplary embodiment, ground element 4 may be connected to ground conductor GND via reactance circuit 13. Reactance circuit 13 exhibits high impedance at frequency f1.

In the antenna unit according to the third exemplary embodiment, a section of ground element 4 containing the second end of ground element 4 may be capacitively coupled to a section of first antenna element 1 containing the open end of first antenna element 1 over a predetermined length. Reactance circuit 13 works to shorten the electrical length of ground element 4 at frequency f4.

The antenna unit according to the third exemplary embodiment includes first and second antenna elements 1 and 2, as well as ground element 4, and thus can operate on three frequency bands despite small size. The antenna unit according to the third exemplary embodiment has ground element 4 and thus can reduce the occurrence of a rise in SAR even during operation on any of the frequency bands (containing frequencies f2 and f4 respectively). The antenna unit that further includes reactance circuit 13 allows ground element 4 to longitudinally overlap first antenna element 1. This configuration encourages the flow of electric currents to ground element 4 and distributes peak electric currents over the elements more effectively, leading to a further reduction in SAR.

4. Fourth Exemplary Embodiment

Figure 12:
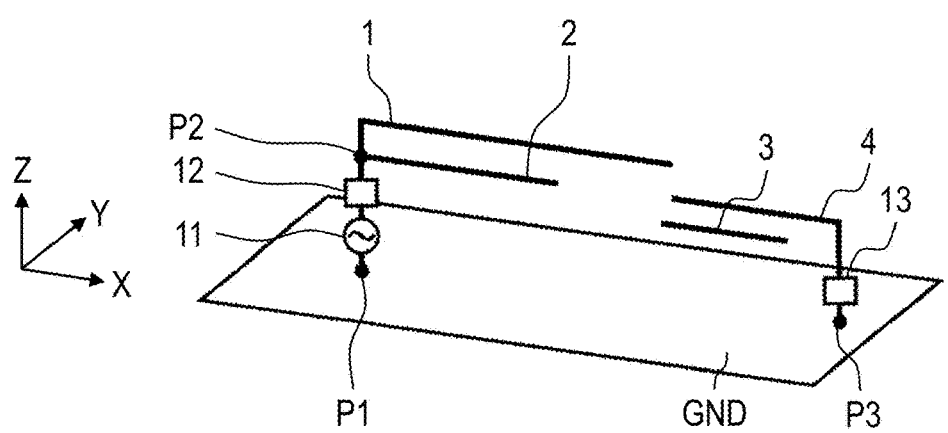
FIG. 12 is a schematic view illustrating a configuration of an antenna unit according to a fourth exemplary embodiment.
Figure 13:
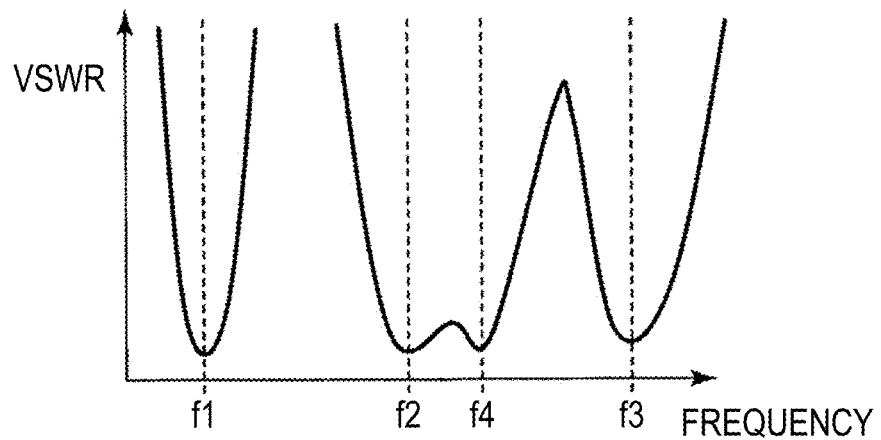
FIG. 13 is a schematic graph illustrating a profile of VSWR versus frequency of the antenna unit of FIG. 12.

With reference to FIGS. 12 and 13, an antenna unit according to a fourth exemplary embodiment will now be described.

4-1. Configuration

FIG. 12 is a schematic view illustrating a configuration of the antenna unit according to the fourth exemplary embodiment. The antenna unit of FIG. 12 is a combination of the second and third exemplary embodiments and includes both parasitic element 3 in FIG. 3 and ground element 4 in FIG. 7.

Parasitic element 3 is disposed along ground conductor GND, whereas a part of ground element 4 is disposed along ground conductor GND. Parasitic element 3 is disposed between the part of ground element 4 disposed along ground conductor GND and ground conductor GND.

4-2. Operation

FIG. 13 is a schematic graph illustrating a profile of VSWR versus frequency of the antenna unit of FIG. 12. Frequencies f2 and f4 are higher than frequency f1. Frequency f3 is higher than frequencies f2 and f4. The antenna unit of FIG. 12 includes first and second antenna elements 1 and 2, as well as parasitic element 3 and ground element 4, and thus can operate on four frequency bands.

While the antenna unit of FIG. 12 is operating at frequency f2, electric currents of frequency f2 flow into parasitic element 3 and ground element 4. This configuration lowers the level of current crowding on second antenna element 2 and reduces the occurrence of a rise in SAR.

As described in the second and third exemplary embodiments, the antenna unit of FIG. 12 reduces the occurrence of a rise in SAR while the antenna unit is operating at any of frequencies f3 and f4.

As described above, parasitic element 3 has an electrical length between substantially one quarter and substantially one half of wavelength $\lambda 3$ corresponding to frequency f3, whereas ground element 4 has an electrical length of substantially one quarter of wavelength $\lambda 4$ corresponding to frequency f4. Thus, if parasitic element 3 and ground element 4 have similar dimensions, parasitic element 3 resonates at a frequency higher than (about twice) a frequency at which ground element 4 resonates, and electric currents are more crowded on parasitic element 3. In the antenna unit of FIG. 12, parasitic element 3 is disposed between the part of ground element 4 disposed along ground conductor GND and ground conductor GND such that the antenna unit reduces the occurrence of a rise in SAR even if electric currents of frequency f3 are flowing into parasitic element 3. This configuration has parasitic element 3 kept away from the human body and thus reduces the occurrence of a rise in SAR even if electric currents of frequency f3 are flowing into parasitic element 3.

4-3. Effects and Others

The antenna unit according to the fourth exemplary embodiment includes both parasitic element 3 and ground element 4.

In the antenna unit according to the fourth exemplary embodiment, parasitic element 3 may be disposed along ground conductor GND, and a part of ground element 4 may be disposed along ground conductor GND. Parasitic element 3 is disposed between the part of ground element 4 disposed along ground conductor GND and ground conductor GND.

The antenna unit according to the fourth exemplary embodiment includes first and second antenna elements 1 and 2, as well as parasitic element 3 and ground element 4, and thus can operate on four frequency bands despite small size. The antenna unit according to the fourth exemplary embodiment has parasitic element 3 and ground element 4, and thus allows a reduction in SAR even during operation on any of the frequency bands (containing frequencies f2, f3, and f4 respectively).

5. Fifth Exemplary Embodiment

Figure 14:
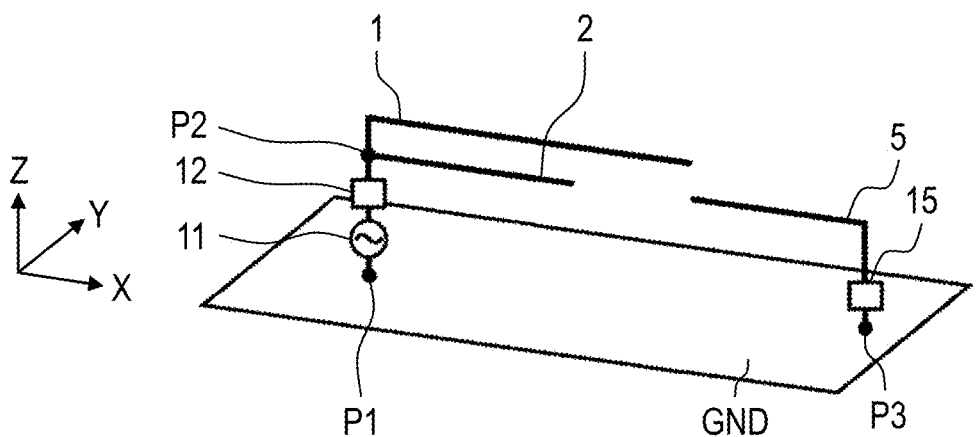
FIG. 14 is a schematic view illustrating a configuration of an antenna unit according to a fifth exemplary embodiment.
Figure 15:
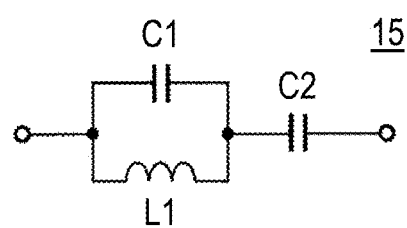
FIG. 15 is a circuit diagram illustrating a configuration of reactance circuit 15 in FIG. 14.
Figure 16:
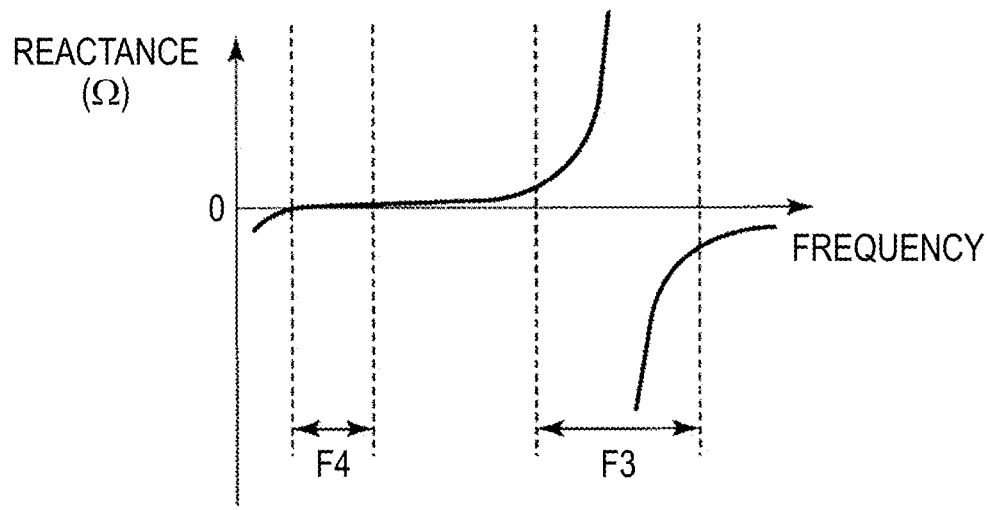
FIG. 16 is a schematic graph illustrating a profile of reactance versus frequency of reactance circuit 15 in FIG. 14.

With reference to FIGS. 14 to 16, an antenna unit according to a fifth exemplary embodiment will now be described.

5-1. Configuration

FIG. 14 is a schematic view illustrating a configuration of the antenna unit according to the fifth exemplary embodiment. The antenna unit of FIG. 15 is equivalent to an antenna unit of FIG. 1 that further includes passive element 5. Passive element 5 has a first end that is electrically connected to connection point P3 on ground conductor GND via reactance circuit 15 and a second end that is disposed so as to be electromagnetically coupled to an open end of first antenna element 1. Passive element 5 is disposed relative to first antenna element 1 such that the first end of passive element 5 is remoter from feedpoint 11 than the second end of passive element 5 is. Reactance circuit 15 exhibits high impedance at frequency f3 other than frequencies f1 and f2, and low impedance at frequency f4 other than frequencies f1, f2 and f3. Reactance circuit 15 acts as a filter circuit that substantially blocks electrical currents of frequency f4.

FIG. 15 is a circuit diagram illustrating a configuration of reactance circuit 15 in FIG. 14. Reactance circuit 15 includes capacitor C1 and inductor L1 connected in parallel, as well as another capacitor C2 connected in series with these parallel-connected parts. FIG. 16 is a schematic graph illustrating a profile of reactance versus frequency of reactance circuit 15 in FIG. 14. Reactance in reactance circuit 15 represents impedance in reactance circuit 15. With reference to FIG. 16, reactance circuit 15 exhibits high impedance over frequency band F3 containing frequency f3 and low impedance over frequency band F4 containing frequency f4. While reactance circuit 15 is exhibiting high impedance, passive element 5 acts as parasitic element 3 in the second exemplary embodiment. While reactance circuit 15 is exhibiting low impedance, passive element 5 acts as ground element 4 in the third exemplary embodiment.

Passive element 5 resonates at frequencies f3 and f4. Thus, passive element 5 has an electrical length that is between substantially one quarter and substantially one half of wavelength $\lambda 3$ corresponding to frequency f3 and an electrical length of substantially one quarter of wavelength $\lambda 4$ corresponding to frequency f4.

5-2. Operation

While the antenna unit of FIG. 14 is operating at frequency f3, passive element 5 acts as parasitic element 3 in the second exemplary embodiment. While the antenna unit of FIG. 14 is operating at frequency f4, passive element 5 acts as ground element 4 in the third exemplary embodiment. The antenna unit of FIG. 14 includes first and second antenna elements 1 and 2, as well as passive element 5, and thus can operate on four frequency bands in like manner with the antenna unit of the fourth exemplary embodiment.

While the antenna unit of FIG. 14 is operating at frequency f2, electric currents of frequency f2 flow into passive element 5. This configuration lowers the level of current crowding on second antenna element 2 and reduces the occurrence of a rise in SAR.

As described in the second and third exemplary embodiments, the antenna unit of FIG. 14 reduces the occurrence of a rise in SAR while the antenna unit is operating at any of frequencies f3 and f4.

5-3. Effects and Others

The antenna unit according to the fifth exemplary embodiment further includes passive element 5. Passive element 5 has the first end that is electrically connected to the connection point on ground conductor GND via reactance circuit 15 and the second end that is disposed so as to be electromagnetically coupled to the open end of first antenna element 1. Passive element 5 is disposed relative to first antenna element 1 such that the first end of passive element 5 is remoter from feedpoint 11 than the second end of passive element 5 is. Reactance circuit 15 exhibits high impedance at frequency f3 other than frequencies f1 and f2, and low impedance at frequency f4 other than frequencies f1, f2 and f3. Passive element 5 resonates at frequencies f3 and f4.

The antenna unit according to the fifth exemplary embodiment includes first and second antenna elements 1 and 2, as well as passive element 5, and thus can operate on four frequency bands despite small size. The antenna unit according to the fifth exemplary embodiment has passive element 5, and thus allows a reduction in SAR even during operation on any of the frequency bands (containing frequencies f2, f3, and f4 respectively). The antenna unit according to the fifth exemplary embodiment has single passive element 5 that integrates parasitic element 3 in the second exemplary embodiment with ground element 4 in the third exemplary embodiment. This configuration allows the antenna unit to come down in size.

6. Sixth Exemplary Embodiment

Figure 17:
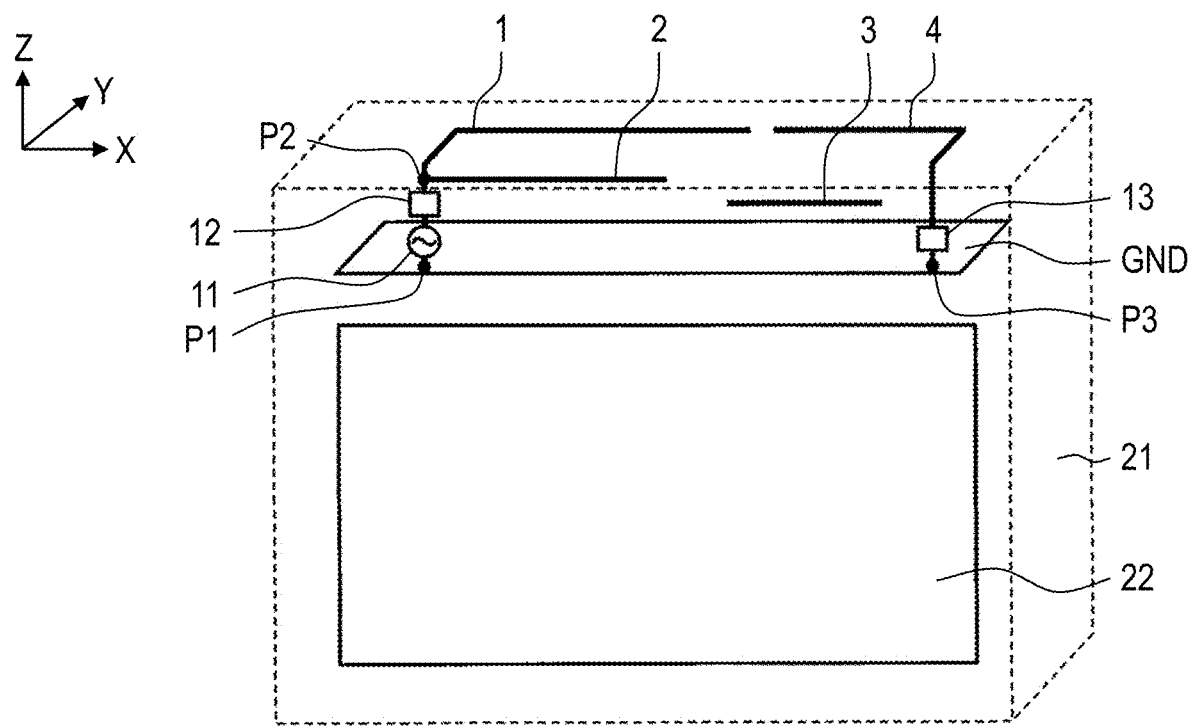
FIG. 17 is a schematic view illustrating a configuration of an electronic device according to a sixth exemplary embodiment.

With reference to FIG. 17, an electronic device according to a sixth exemplary embodiment will now be described.

6-1. Configuration

FIG. 17 is a schematic view illustrating a configuration of the electronic device according to the sixth exemplary embodiment. The electronic device of FIG. 17 includes an antenna unit according to any of the first to fifth exemplary embodiments, casing 21 having a first surface and a second surface opposite to each other, and display 22 provided on the first surface of casing 21. Hereafter, the first surface of casing 21 (at a negative side in the Y-direction in FIG. 17) is referred to as a "front surface", and the second surface of casing 21 (at a positive side in the Y-direction in FIG. 17) is referred to as a "rear surface". In the example of FIG. 17, the electronic device includes the antenna unit of the fourth exemplary embodiment.

If the electronic device is, for example, a tablet-type electronic device equipped with a display, the rear surface of the electronic device is presumably held by a user's hand or other body part while the device is in use. Consequently, the necessity to reduce the occurrence of a rise in SAR is greater at the rear surface than at the front surface of the electronic device. Since frequency f2 at which second antenna element 2 resonates is higher than frequency f1 at which first antenna element 1 resonates, second antenna element 2 is closer to the front surface than to the rear surface of casing 21. This configuration keeps second antenna element 2 away from the human body. If the interior of casing 21 has little dimensional allowance, first antenna element 1 may be closer to the rear surface than to the front surface of casing 21. If the interior of casing 21 has dimensional allowance, first antenna element 1 may be closer to the front surface than to the rear surface of casing 21.

If the electronic device is equipped with the antenna unit of the second exemplary embodiment, parasitic element 3 may be closer to the front surface than to the rear surface of casing 21.

If the electronic device is equipped with the antenna unit of the third exemplary embodiment, ground element 4 may be closer to the front surface than to the rear surface of casing 21.

If the electronic device is equipped with the antenna unit of the fourth exemplary embodiment, any one of parasitic element 3 and ground element 4, whichever resonates at a higher frequency, may be closer to the front surface than to the rear surface of casing 21. If the interior of casing 21 has dimensional allowance, both parasitic element 3 and ground element 4 may be closer to the front surface than to the rear surface of casing 21.

If the electronic device is equipped with the antenna unit of the fifth exemplary embodiment, passive element 5 may be closer to the front surface than to the rear surface of casing 21.

6-2. Effects and Others

The electronic device in the sixth exemplary embodiment includes any one of the antenna units according to the first to fifth exemplary embodiments.

The electronic device according to the sixth exemplary embodiment may include casing 21 having a first surface and a second surface opposite to each other and display 22 provided on the first surface of casing 21. Second antenna element 2 is closer to the first surface than to the second surface of casing 21.

In the electronic device according to the sixth exemplary embodiment, parasitic element 3 may be closer to the first surface than to the second surface of casing 21.

In the electronic device according to the sixth exemplary embodiment, ground element 4 may be closer to the first surface than to the second surface of casing 21.

In the electronic device according to the sixth exemplary embodiment, passive element 5 may be closer to the first surface than to the second surface of casing 21.

The electronic device in the sixth exemplary embodiment includes any of the antenna units according to the first to fifth exemplary embodiments and thus can operate on a plurality of frequency bands despite small size. The electronic device according to the sixth exemplary embodiment can reduce the occurrence of a rise in SAR during operation on any of the frequency bands since at least one of second antenna element 2, parasitic element 3, ground element 4, and passive element 5 is closer to the front surface than to the rear surface of casing 21. The electronic device according to the sixth exemplary embodiment allows a reduction in SAR especially at the rear surface of casing 21.

7. Examples

Figure 18:
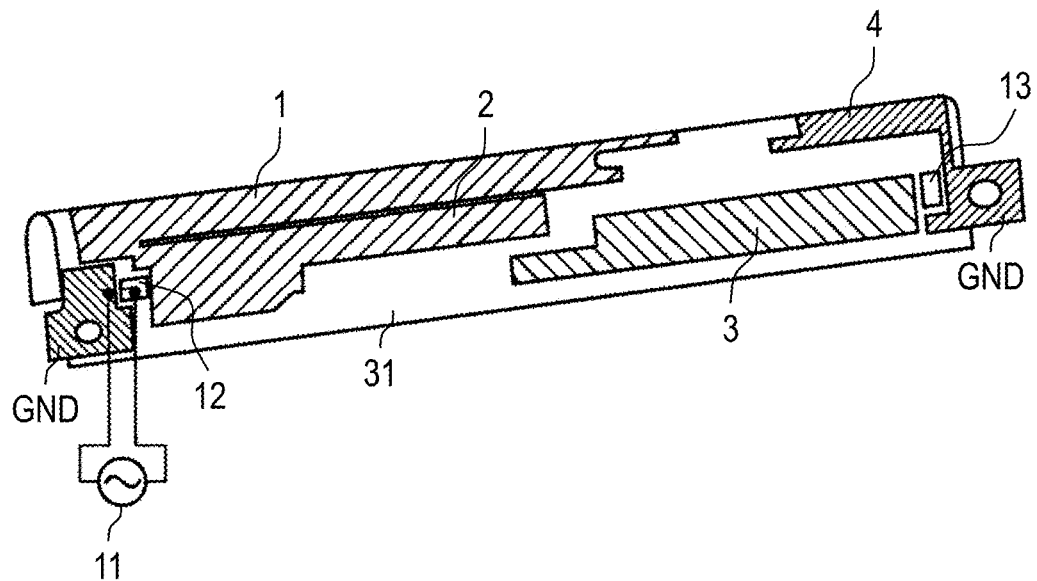
FIG. 18 is a perspective view illustrating example implementation of the antenna unit according to the fourth exemplary embodiment.
Figure 19:
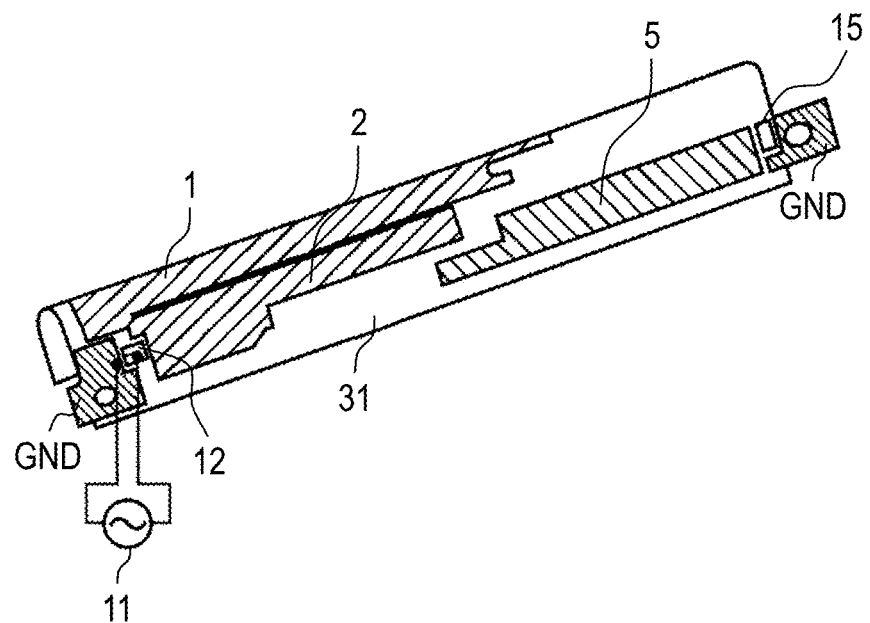
FIG. 19 is a perspective view illustrating example implementation of the antenna unit according to the fifth exemplary embodiment.

FIG. 18 is a perspective view illustrating example implementation of the antenna unit according to the fourth exemplary embodiment. FIG. 19 is a perspective view illustrating example implementation of the antenna unit according to the fifth exemplary embodiment. The components of the antenna unit according to each of the first to fifth exemplary embodiments are formed on dielectric substrate 31, i.e. a flexible circuit, for example. Dielectric substrate 31 may be bent. This configuration, if the antenna unit of FIG. 18 is put in the electronic device of the sixth exemplary embodiment, allows second antenna element 2 and parasitic element 3 to be closer to the front surface than to the rear surface of casing 21. In this configuration, first antenna element 1 and ground element 4 are closer to the rear surface than to the front surface of casing 21. Likewise, if the antenna unit of FIG. 19 is put in the electronic device of the sixth exemplary embodiment, this configuration allows second antenna element 2 and passive element 5 to be closer to the front surface than to the rear surface of casing 21. In this configuration, first antenna element 1 is closer to the rear surface than to the front surface of casing 21. In FIGS. 18 and 19, ground conductor GND is connected to a metallic chassis or any conductive part inside casing 21 of the electronic device.

Figure 20:
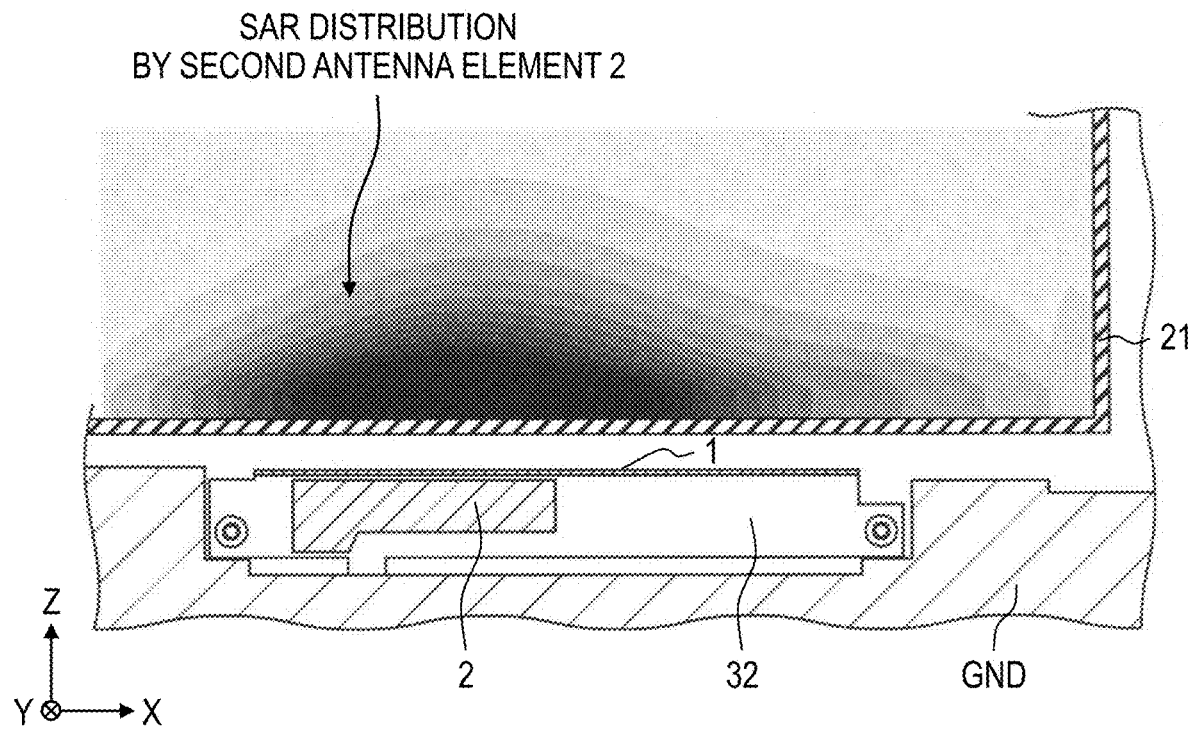
FIG. 20 is a graph illustrating a profile of specific absorption rate (SAR) distribution for the antenna unit of the first exemplary embodiment operating at frequency f2.

FIG. 20 is a graph illustrating a profile of SAR distribution for the antenna unit of the first exemplary embodiment operating at frequency f2. The antenna unit of FIG. 20 is put in casing 21 of the electronic device according to the sixth exemplary embodiment. First antenna element 1 is composed of a strip-shaped conductor disposed parallel to an xy plane in FIG. 20. Second antenna element 2 is formed on dielectric substrate 32. Since second antenna element 2 is disposed between first antenna element 1 and ground conductor GND, the SAR measured outside casing 21 is high only in a very limited range that is within a small distance from casing 21. Thus, if the human body is satisfactorily apart from casing 21, the SAR is low.

Figure 21:
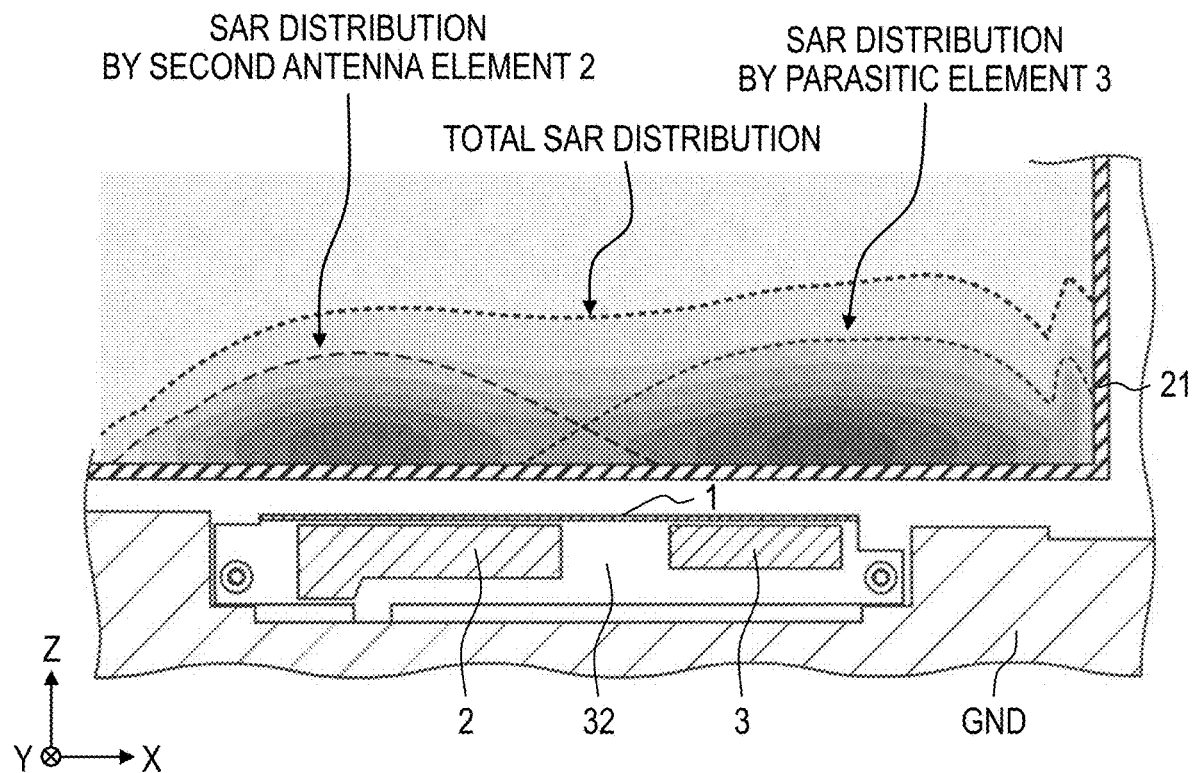
FIG. 21 is a graph illustrating a profile of SAR distribution for the antenna unit of the second exemplary embodiment operating at frequency f2.

FIG. 21 is a graph illustrating a profile of SAR distribution for the antenna unit of the second exemplary embodiment operating at frequency f2. The antenna unit of FIG. 21 is put in casing 21 of the electronic device according to the sixth exemplary embodiment. First antenna element 1 is composed of a strip-shaped conductor disposed parallel to an xy plane in FIG. 21. Second antenna element 2 and parasitic element 3 are formed on dielectric substrate 32. The antenna unit of FIG. 21 has parasitic element 3 and thus distributes electric currents of frequency f2 to a wider range than the antenna unit of FIG. 20. The antenna unit of FIG. 21 allows electric currents of frequency f2 to flow into parasitic element 3, and thereby lowers the level of current crowding on second antenna element 2 and reduces the SAR more effectively than the antenna unit of FIG. 20.

While the antenna units of FIGS. 20 and 21 are each operating at frequency f2, electric currents of frequency f2 flow into first antenna element 1 as well and these electric currents contribute to an increase in SAR in a strict sense. However, frequency f1 at which first antenna element 1 resonates is apart from frequency f2 and consequently first antenna element 1 makes a minor contribution to the SAR increase during operation of the antenna unit at frequency f2. Thus, FIGS. 20 and 21 omit the minor contribution made by first antenna element 1 to the SAR increase.

Other Exemplary Embodiments

The first to sixth exemplary embodiments described above are provided to illustrate technologies disclosed in this patent application. Technologies according to the present disclosure, however, can be applied to any variations to which change, replacement, addition, omission, or the like are appropriately made, other than the exemplary embodiments. A new exemplary embodiment can be made by combining some structural elements in any of the first to sixth exemplary embodiments described above.

In light of this, other exemplary embodiments will now be shown.

The first to sixth exemplary embodiments each have flat-shaped ground conductor GND as a conductive ground plate, for example. The conductive ground plate may be a predetermined area on a metallic chassis of an electronic device, however, and may have any shape other than the flat shape, with proviso that a second antenna element is disposed between a first antenna element and the conductive ground plate.

FIG. 4 shows an instance in which frequency f3 is higher than frequency f2. But frequency f3 may be lower than frequency f2. Likewise, FIG. 8 shows an instance in which frequency f4 is higher than frequency f2. But frequency f4 may be lower than frequency f2. FIG. 13 shows an instance in which frequency f3 is higher than frequency f4. But frequency f4 may be higher than frequency f3.

The exemplary embodiments described above are provided to illustrate technologies according to the present disclosure. For that purpose, the accompanying drawings and detailed description are provided.

Consequently, the accompanying drawings and detailed description provided to illustrate the technologies described above may include structural elements that are not essential for resolving problems as well as those essential for resolving problems. Thus, these non-essential structural elements, if they are included in the accompanying drawings or detailed description, should not be construed as essential structural elements.

Since the exemplary embodiments described above are provided to illustrate technologies according to the present disclosure, various kinds of change, replacement, addition, omission, or the like may be made to these exemplary embodiments without departing from the scope of the claims and equivalents thereof.

INDUSTRIAL APPLICABILITY

An antenna unit according to the present disclosure can operate on multiple bands of frequencies and is very effective among multiband antennas if the antenna unit is required to operate on a wider range of frequencies. The antenna unit according to the present disclosure can reduce the occurrence of a rise in SAR and readily satisfy SAR-specific regulatory requirements.

REFERENCE MARKS IN THE DRAWINGS 1 first antenna element
2 second antenna element
3 parasitic element
4 ground element
5 passive element
11 feedpoint
12 matching circuit
13, 15 reactance circuit
14 capacity coupler
21 casing
22 display
31, 32 dielectric substrate
GND ground conductor
P1, P3 connection point
P2 branch point

The invention claimed is:

1. An antenna unit comprising:
a conductive ground plate;
a first antenna element;
a second antenna element; and
a first parasitic element having a first end and a second end, the first parasitic element being disposed relative to the first antenna element such that the first end of the first parasitic element is electromagnetically coupled to the open end of the first antenna element and the second end of the first parasitic element is remoter from the feedpoint than the first end of the first parasitic element is,
wherein the first antenna element includes a first end connected to a feedpoint and a second end containing an open end,
wherein a part of the first antenna element is disposed along the conductive ground plate, wherein the second antenna element branches off the first antenna element at a branch point on the first antenna element, and the second antenna element is disposed between the part of the first antenna element disposed along the conductive ground plate and the conductive ground plate, wherein the first antenna element resonates at a first frequency, wherein the second antenna element and a segment between the first end and the branch point of the first antenna element resonate at a second frequency that is higher than the first frequency, wherein the first parasitic element has no electrical connection with the conductive ground plate, and the first parasitic element resonates at a third frequency other than the first and the second frequencies, and wherein the first parasitic element is configured such that a distance between the first parasitic element and the second antenna element is larger than a distance between the first parasitic element and the first antenna element.

2. The antenna unit according to claim 1, further comprising a ground element having a first end electrically connected to a connection point on the conductive ground plate and a second end that is disposed so as to be electromagnetically coupled to the open end of the first antenna element, wherein the ground element is disposed relative to the first antenna element such that the first end of the ground element is remoter from the feedpoint than the second end of the ground element is, and the ground element resonates at a fourth frequency other than the first and the second frequencies.

3. The antenna unit according to claim 2, wherein the ground element is connected to the conductive ground plate via a reactance circuit.

4. The antenna unit according to claim 3, wherein a section of the ground element containing the second end of the ground element is capacitively coupled to a section of the first antenna element containing the open end of the first antenna element over a predetermined length, and wherein the reactance circuit works to shorten an electrical length of the ground element at the fourth frequency.

5. The antenna unit according to claim 1, further comprising a ground element having a first end electrically connected to a connection point on the conductive ground plate and a second end that is disposed so as to be electromagnetically coupled to the open end of the first antenna element, wherein the ground element is disposed relative to the first antenna element such that the first end of the ground element is remoter from the feedpoint than the second end of the ground element is, and the ground element resonates at a fourth frequency other than the first and the second frequencies, wherein the first parasitic element is disposed along the conductive ground plate, wherein a part of the ground element is disposed along the conductive ground plate, and wherein the first parasitic element is disposed between the part of the ground element disposed along the conductive ground plate and the conductive ground plate.

6. An electronic device comprising the antenna unit according to claim 1.

7. The electronic device according to claim 6, further comprising:

a casing having a first surface and a second surface opposite to each other; and a display provided on the first surface of the casing, wherein the second antenna element is closer to the first surface of the casing than to the second surface of the casing.

8. The electronic device according to claim 7, wherein the first parasitic element is closer to the first surface of the casing than to the second surface of the casing.

9. The electronic device according to claim 7, wherein the antenna unit includes a ground element having a first end electrically connected to a connection point on the conductive ground plate and a second end that is disposed so as to be electromagnetically coupled to the open end of the first antenna element, wherein the ground element is disposed relative to the first antenna element such that the first end of the ground element is remoter from the feedpoint than the second end of the ground element is, and the ground element resonates at a fourth frequency other than the first and the second frequencies, and wherein the ground element is closer to the first surface of the casing than to the second surface of the casing.

10. The antenna unit according to claim 1, wherein the first parasitic element is configured such that the third frequency is higher than the second frequency.

11. The antenna unit according to claim 2, wherein the ground element is configured such that the fourth frequency is higher than the second frequency.

12. The antenna unit according to claim 2, wherein the ground element is configured such that the fourth frequency is lower than the third frequency.

13. The antenna unit according to claim 2, wherein the ground element is configured such that the fourth frequency is between the second frequency and the third frequency.

* * * * *